(12) United States Patent
Chang et al.

(10) Patent No.: US 6,333,814 B1
(45) Date of Patent: Dec. 25, 2001

(54) STABLE OCULAR MOUNTING ASSEMBLY

(75) Inventors: Byung Jin Chang, Ann Arbor; Thomas Cummings, Jackson, both of MI (US)

(73) Assignee: General Scientific Corporation, Ann Arbor, MI (US)

( * ) Notice: Subject to any disclaimer, the term of this patent is extended or adjusted under 35 U.S.C. 154(b) by 0 days.

(21) Appl. No.: 09/579,781

(22) Filed: May 26, 2000

(51) Int. Cl.[7] .............................. G02B 23/00; G02C 1/00
(52) U.S. Cl. ........................ 359/411; 359/407; 359/417; 351/158
(58) Field of Search ................................ 359/405–415, 359/480–482, 503, 506; 351/57–58, 49, 158

(56) References Cited

U.S. PATENT DOCUMENTS

| | | | |
|---|---|---|---|
| 5,381,263 | 1/1995 | Nowak et al. ...................... | 359/411 |
| 5,604,631 * | 2/1997 | Gelardi et al. ..................... | 359/412 |
| 5,640,271 * | 6/1997 | Nishitani et al. .................. | 359/412 |
| 5,896,209 * | 4/1999 | Funatsu ............................. | 359/417 |
| 6,064,520 * | 5/2000 | Nowak et al. ..................... | 359/411 |

* cited by examiner

*Primary Examiner*—Thong Nguyen
(74) *Attorney, Agent, or Firm*—Gifford, Krass, Groh, Sprinkle, Anderson & Citkowski, PC

(57) ABSTRACT

An improved ocular mounting assembly having a pair of ocular support arms which can be extended by sliding out of a box-section assembly housing for supporting a pair of ocular devices attached to the ends of the support arms. The improvement is a pair of stabilizers disposed inside the assembly housing and providing stability against rotational motion when the arms are extended. In one embodiment, the stabilizers are interference-fitted balls, retained in position by retainer holes in the assembly housing, and receding into recess cut-outs at the end of the support arms when the arms are fully retracted. In an alternate embodiment, the stabilizers are L-shaped, and can be either an integral part of the housing or bonded to it with adhesive.

11 Claims, 5 Drawing Sheets

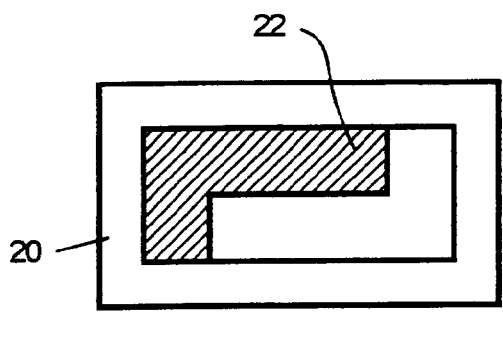
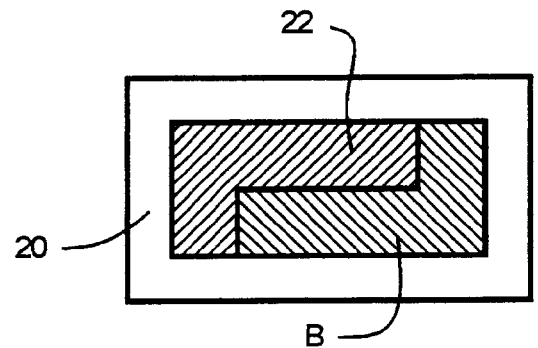
Fig - 5A     Fig - 5B
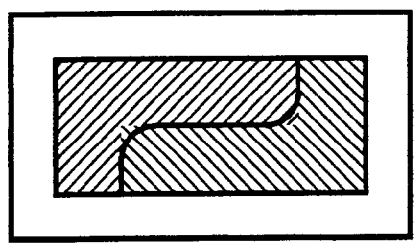
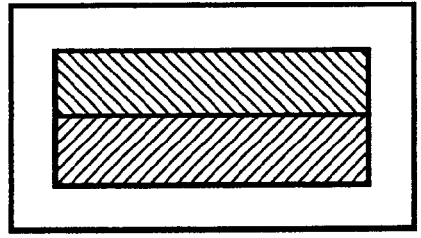
Fig - 6     Fig - 7

STABLE OCULAR MOUNTING ASSEMBLY

FIELD OF THE INVENTION

The present invention relates to ocular mounting assemblies and, in particular, to an improvement providing rotational stability to such assemblies.

BACKGROUND OF THE INVENTION

Telemicroscopic instruments are used for magnifying the work area during precision work such as microsurgery, dental work, inspection of circuit board solder joints, and assembly of miniature parts. Such instruments, typically including a pair of microscopic loupes, are adjustably mounted to an eyeglass frame or head mount by an ocular mounting assembly.

As one example, the ocular mounting assembly disclosed in U.S. Pat. No. 5,381,263 allows the mounting of a pair of ocular devices to an eyeglass frame, or head mount, and is linearly or rotationally adjustable through five degrees of freedom. An adjustable ocular support assembly with slidably extendable arms provides interpupillary distance, convergence angle and view adjustment of the ocular devices, which are rotatable attached to the support. An adjustable clamp assembly is rotatably attached to the ocular support assembly and provides height and view angle adjustment of the ocular devices. When the slidable arms of the ocular support assembly are extended, however, some rotating motion may occur, in particular with heavier oculars and with fully extended support arms. The rotating motion causes vertical misalignment, or divergence, of the axes of the ocular devices. Excessive divergence can cause eyestrain, discomfort and even headaches.

SUMMARY OF THE INVENTION

The present invention stabilizes ocular mounting assemblies against twisting motions, while preventing rotational misalignment of the slidable support arms. In a disclosed example, the ocular support assembly includes a box-section ocular support assembly housing, a pair of ocular support arms slidably disposed within the housing and an interpupillary adjustment knob that causes the arms to slide in and out of the housing for adjustment of the interpupillary distance of the ocular devices. When the arms of the ocular support are completely retracted, the sections of the arms inside the housing engage with one another and provide stable rotational support. As the arms extend, some of this support is lost.

The improvement resides in the inclusion of two rotational stabilizing structural members disposed in the housing which provide stability against undesirable twisting and rotation, even when the arms are fully extended.

In one embodiment, the rotational stabilizers preferably comprise two L-shaped members, which are anti-symmetrically disposed in the ocular support assembly housing, and which are either an integral part of the housing or separate members adhesively bonded to the housing. In an alternate embodiment, a pair of balls are used inside the assembly housing having an interference fit with the support arms and the housing. Two retaining holes in the assembly housing create a relief area for each stabilizing ball. The size of the diameter of the retaining holes controls the amount of interference. The end of each support arm incorporates a recess cut-out, into which the respective ball recedes when the support arms are fully closed.

BRIEF DESCRIPTION OF THE DRAWINGS

FIG. 5A shows end view b—b of the housing when the support arms are fully extended and there is no stabilizer;

FIG. 5B shows end view b—b of the housing when the arms are fully extended and the L-shaped stabilizers are included;

FIG. 6 is a drawing which shows an embodiment of the invention wherein the support arm and stabilizing member have one or more curved edges;

FIG. 7 illustrates yet another embodiment of the invention wherein the support arm and the stabilizing member are themselves rectangular;

DETAILED DESCRIPTION OF THE INVENTION

Figure 1:
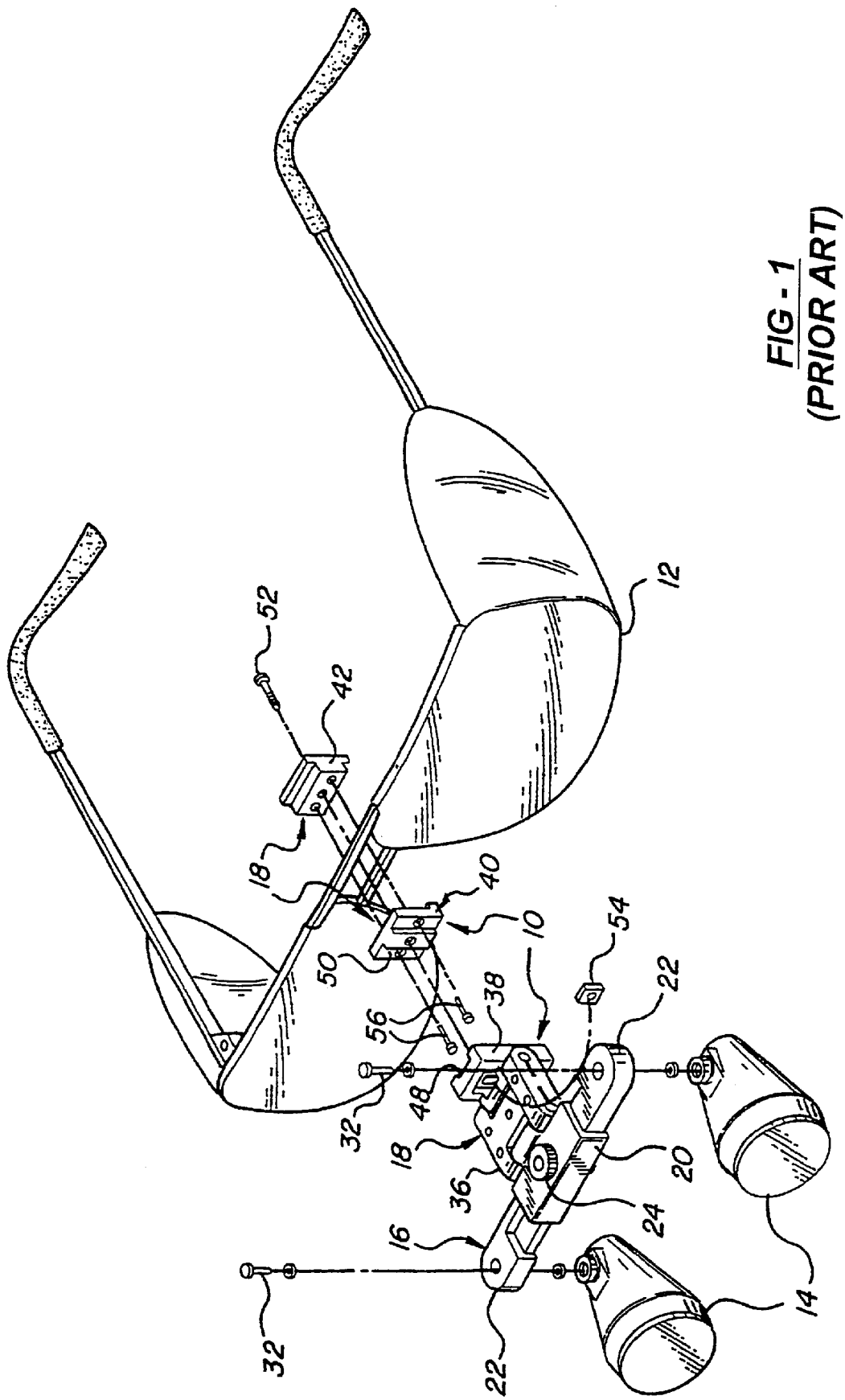
FIG. 1 is a perspective view of an ocular mounting assembly of the type to which this invention is applicable.
Figure 2:
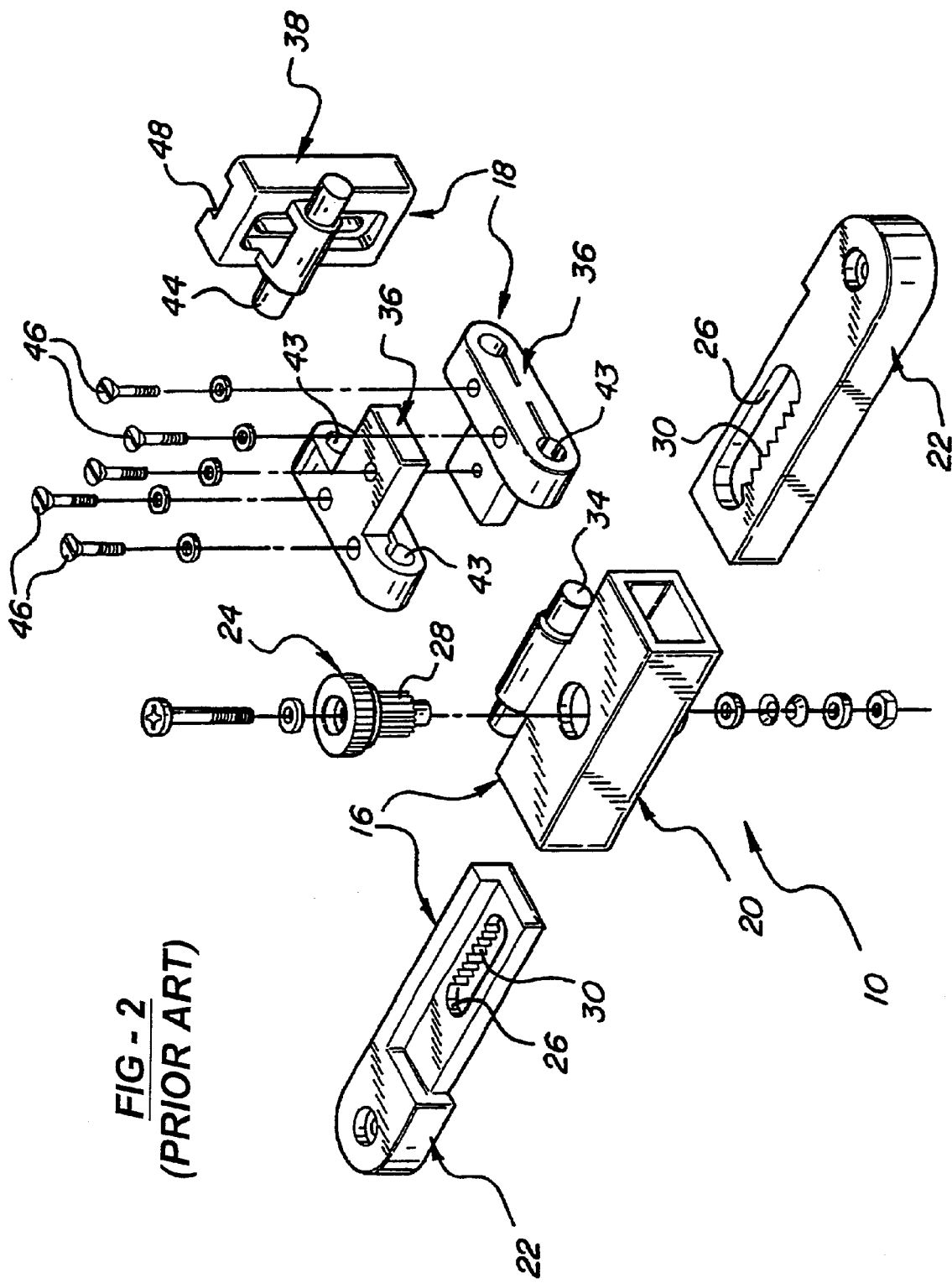
FIG. 2 shows details of the ocular mounting assembly and the ocular support assembly housing of FIG. 1.
Figure 3:
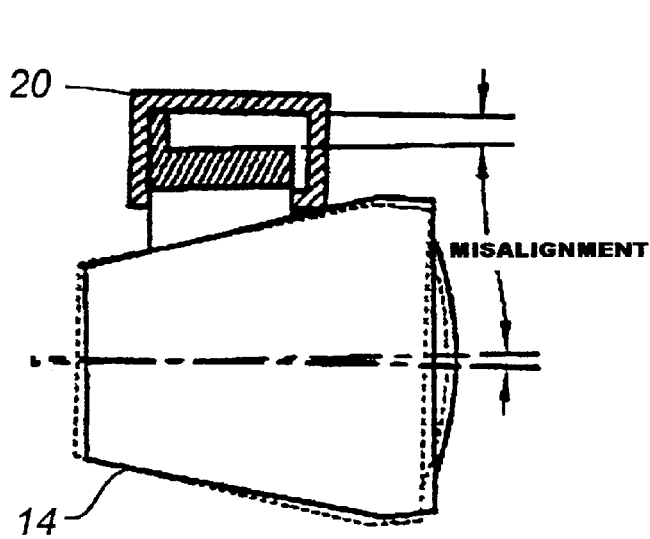
FIG. 3 is an end view of a part of an ocular mounting assembly showing a vertical misalignment between two ocular devices.

The present invention is an improvement of an ocular mounting assembly of the type having slidable support arms in a rectangular ocular support assembly housing. One such ocular mounting assembly is disclosed in U.S. Pat. No. 5,381,263 and is shown in perspective in FIG. 1, and in expanded view in FIG. 2. FIG. 3 shows the vertical misalignment between the axes of two ocular devices 14, when no stabilizers are included in the assembly housing 20.

Figure 4:
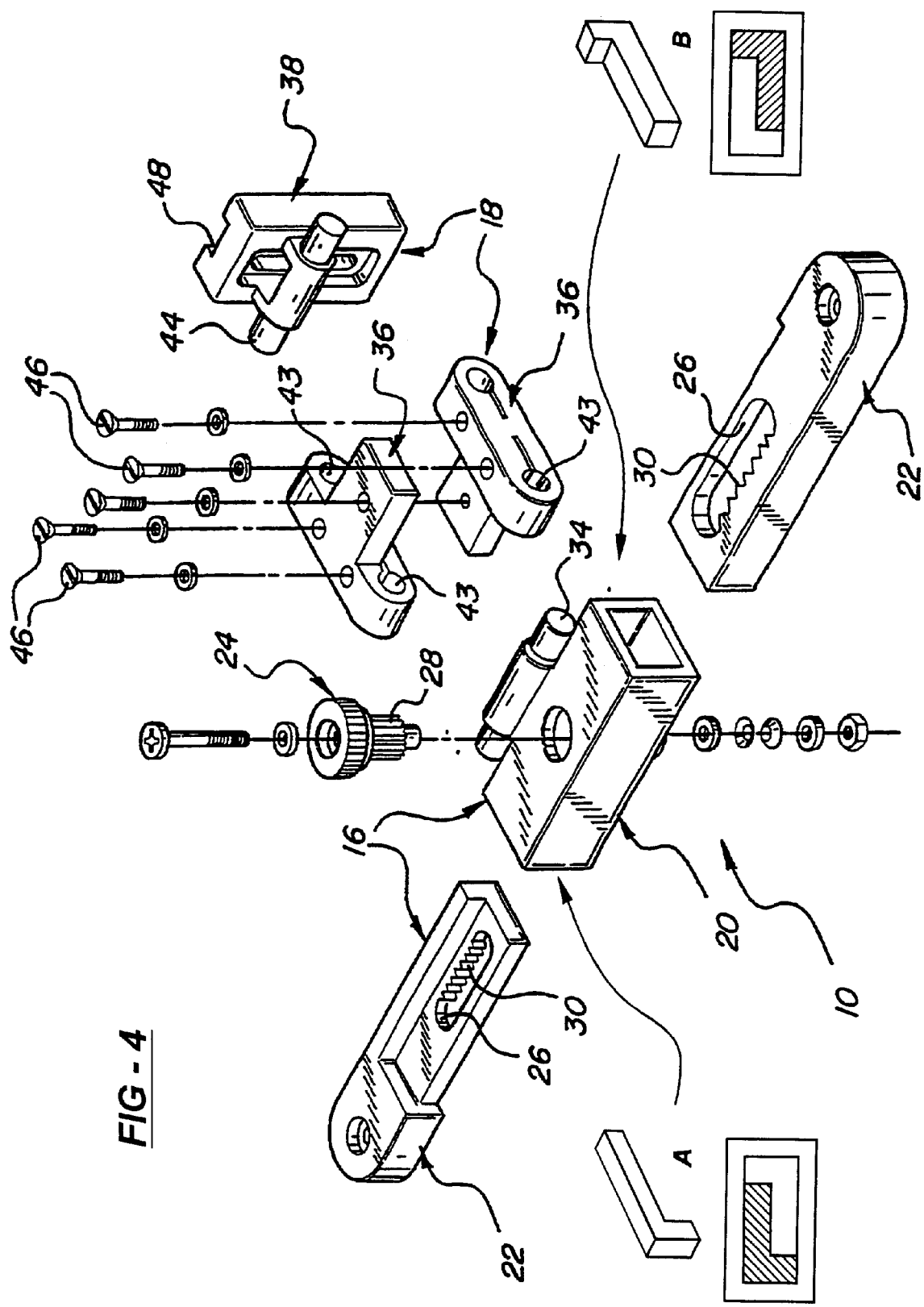
FIG. 4 shows the improvement in the housing made possible by the L-shaped stabilizers of the present invention.

In the embodiment of FIG. 4, the improved ocular mounting assembly includes the L-shaped stabilizing members A and B at the ends of the housing 20. FIG. 5A shows end view b—b of the housing when the support arms 22 are fully extended, but there are no stabilizers in the assembly housing 20. The stabilizers A and B provide an interlocking interface with the complementing L-shaped ends of the slidable support arms 22 at each end of the housing, as shown in FIG. 5B, which is end view b—b of the housing when the support arms are fully extended.

Members A and B can be an integral part of the housing, or are manufactured separately and then bonded with adhesive at the ends of the housing. As a further option, the members may have stubs or tabs which are received by corresponding recesses in the housing allowing the members to snap into place. The length of the support arms 22 is adjusted to accommodate the thickness of members A and B inside the housing. The stabilizers need not be L-shaped, so long as they complement the shape of the ends of the support members that slide into the housing.

The addition of stabilizing structural members A and B to the ocular assembly housing is a significant improvement over the prior art because it provides an interlocking support against rotational motion of the support arms inside the housing adding stability against rotational motion when the support arms are extended to any, up to their full, length. This support is particular important when the arms are fully extended and the ocular devices are relatively heavy, as it prevents undesirable rotational misalignment, divergence and vibration of the support assembly.

FIG. 6 is a drawing which shows an embodiment of the invention wherein the support arm and stabilizing member have one or more curved edges. FIG. 7 illustrates another embodiment of the invention wherein the support arm and the stabilizing member are themselves rectangular. FIG. 8 illustrate an alternate embodiment of the invention, wherein the stabilizers are balls. FIG. 8A is a top view and FIG. 8B an elevated view of part of the ocular mounting assembly showing the ocular devices 14, the supports arms 22 and the assembly housing 20. The stabilizing balls 70 are interference-fitted between the housing 20 and the slidable support arms 22 at diagonally opposite corners of the housing 20. The stabilizing effect is important when the support arms are extended outwardly from the housing. When the arms are fully retracted into the housing, the balls recede into recess cut-outs 72 at the ends of the support arms 22.

Figure 8C:
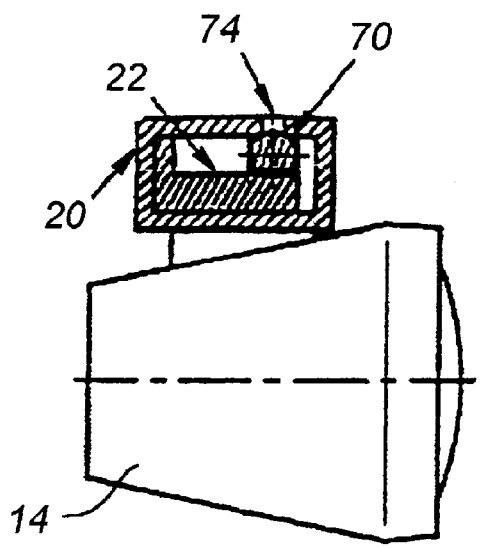
FIG. 8C is an end view of an embodiment of the invention wherein the stabilizers are balls.
Figure 8A:
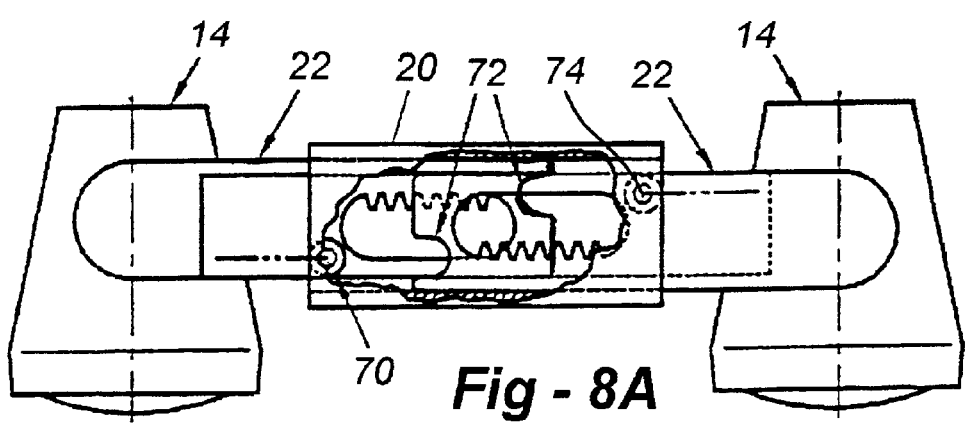
FIG. 8A is a top view of an embodiment of the invention wherein the stabilizers are balls.
Figure 8B:
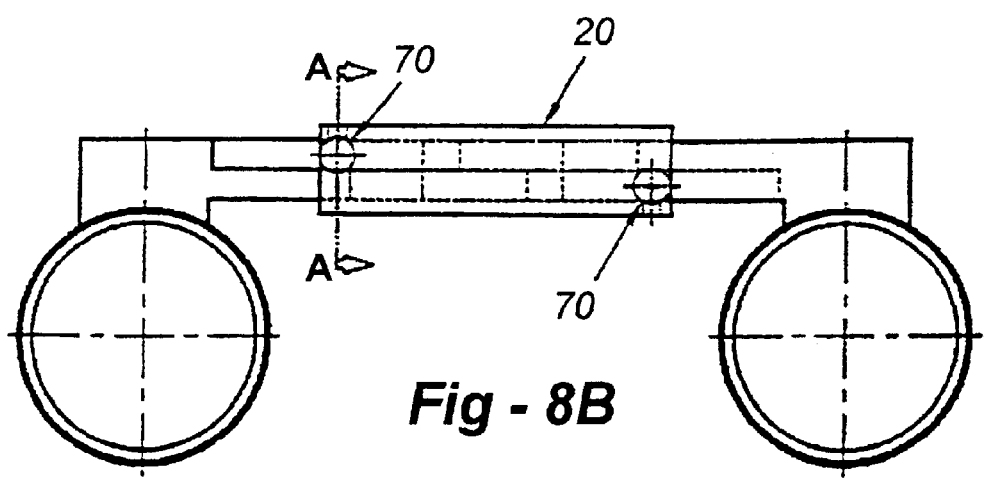
FIG. 8B is an elevated view of an embodiment of the invention wherein the stabilizers are balls.

FIG. 8C shows cross-section A—A of the assembly housing 20. The stabilizing ball 70 is interference-fitted between the assembly housing 20 and the support arm 22. The ball 70 is retained in place by retainer hole 74. The diameter of the retainer hole 74 is chosen to provide the desirable amount of interference fit. A large diameter allows the ball to move further into the hole, thus reducing the contact pressure on the arms.

Although the improvement has been described for a five-degree-of-freedom ocular mounting assembly, a person of ordinary skill in the art can easily adapt it to any ocular assembly that includes slidable support arms for adjusting the interpupillary distance of ocular devices.

What is claimed is:

1. An improved ocular mounting assembly having a pair of ocular support arms slidably disposed within an assembly housing, each arm having an end for supporting a respective ocular, cross-sectional geometry of the support arms being such that an open space is created in the housing when the arms are extended, the improvement comprising:
    a pair of stabilizing structural members, one disposed inside each end of the assembly housing so as to occupy at least a portion of the open space left by the support arms inside a cross-section of the housing at the ends of the assembly housing, thereby stabilizing the support arms, when the support arms are extended from the ends of the assembly housing.

2. The improved ocular mounting assembly of claim 1, wherein the stabilizing structural members are interference-fitted balls, each ball fitted into a retaining hole in the assembly housing.

3. The improved ocular mounting assembly of claim 2, wherein the ends of the ocular support arms incorporate recess cut-outs to receive the stabilizing balls and allow the support arms to close completely.

4. The improved ocular mounting assembly of claim 1, wherein the stabilizing structural members are an integral part of the assembly housing.

5. The improved ocular mounting assembly of claim 1, wherein the stabilizing structural members are separate members adhesively bonded to the assembly housing.

6. An improved ocular mounting assembly having a pair of ocular support arms slidably disposed within an assembly housing having a rectangular cross-section, each arm terminating in an end to which there is attached a respective ocular, the support arms having an outer boundary and an inner boundary, a portion of the outer boundary having a shape conforming with the rectangular shape of the cross-section of the housing, thereby creating an open space in the cross-section of the housing when the arms are fully extended, wherein the improvement comprises:
    a pair of stabilizing structural members disposed inside each end of the assembly housing substantially occupying the space left by the support arms inside the cross-section of the housing at the ends of the assembly housing and providing an interlocking interface with the ends of the support arms at the ends of the assembly housing.

7. The improved ocular mounting assembly of claim 6, wherein the stabilizing structural members are an integral part of the assembly housing.

8. The improved ocular mounting assembly of claim 7, wherein both the support arms and the stabilizing members are L-shaped in cross-section.

9. The improved ocular mounting assembly of claim 6, wherein the stabilizing structural members are separate members adhesively bonded to the assembly housing.

10. The improved ocular mounting assembly of claim 9, wherein both the support arms and the stabilizing members are L-shaped in cross-section.

11. The improved ocular mounting assembly of claim 6, wherein both the support arms and the stabilizing members are L-shaped in cross-section.

* * * * *